United States Patent
Fukutomi et al.

(10) Patent No.: US 11,621,015 B2
(45) Date of Patent: Apr. 4, 2023

(54) LEARNING SPEECH DATA GENERATING APPARATUS, LEARNING SPEECH DATA GENERATING METHOD, AND PROGRAM

(71) Applicant: NIPPON TELEGRAPH AND TELEPHONE CORPORATION, Tokyo (JP)

(72) Inventors: Takaaki Fukutomi, Yokohama (JP); Manabu Okamoto, Yokohama (JP); Takashi Nakamura, Yokosuka (JP); Kiyoaki Matsui, Yokohama (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/979,393

(22) PCT Filed: Mar. 11, 2019

(86) PCT No.: PCT/JP2019/009595
§ 371 (c)(1),
(2) Date: Sep. 9, 2020

(87) PCT Pub. No.: WO2019/176830
PCT Pub. Date: Sep. 19, 2019

(65) Prior Publication Data
US 2021/0005215 A1 Jan. 7, 2021

(30) Foreign Application Priority Data
Mar. 12, 2018 (JP) .............................. JP2018-044278

(51) Int. Cl.
*G10L 21/0208* (2013.01)
*G10L 21/013* (2013.01)
*G10L 15/06* (2013.01)

(52) U.S. Cl.
CPC ........ *G10L 21/0208* (2013.01); *G10L 15/063* (2013.01); *G10L 21/013* (2013.01); *G10L 2021/0135* (2013.01)

(58) Field of Classification Search
CPC ......... G10L 21/0208; G10L 2021/0135; G10L 15/063
See application file for complete search history.

(56) References Cited

U.S. PATENT DOCUMENTS 9,286,883 B1 * 3/2016 Ayrapetian .......... G10L 21/0208
2008/0228477 A1 * 9/2008 Fingscheidt ............ G10L 15/20
704/233

(Continued)

OTHER PUBLICATIONS

International Search Report dated May 21, 2019 in PCT/JP2019/009595 filed on Mar. 11, 2019.

(Continued)

*Primary Examiner* — Bryan S Blankenagel
(74) *Attorney, Agent, or Firm* — Oblon, McClelland, Maier & Neustadt, L.L.P.

(57) ABSTRACT

A training speech data generating apparatus includes: a voice conversion unit that converts, using fourth noise data, which is noise data based on third noise data, and speech data, the speech data so as to make the speech data clearly audible under a noise environment corresponding to the fourth noise data; and a noise superimposition unit that obtains training speech data by superimposing the third noise data and the converted speech data.

3 Claims, 2 Drawing Sheets

(56) References Cited

U.S. PATENT DOCUMENTS

| | | | | |
|---|---|---|---|---|
| 2010/0042412 A1* | 2/2010 | Aronowitz | ............. | G10L 25/87 |
| | | | | 704/E11.001 |
| 2012/0090028 A1* | 4/2012 | Lapsley | ............. | H04L 63/1416 |
| | | | | 704/E21.001 |
| 2013/0090926 A1* | 4/2013 | Grokop | ................... | G10L 25/78 |
| | | | | 704/243 |
| 2016/0171974 A1* | 6/2016 | Hannun | ............... | G10L 15/063 |
| | | | | 704/232 |
| 2017/0278525 A1* | 9/2017 | Wang | ...................... | G10L 25/84 |
| 2019/0034048 A1* | 1/2019 | Gibbons | ............. | H04N 21/488 |
| 2019/0228791 A1* | 7/2019 | Sun | ..................... | G10L 21/0272 |
| 2020/0294522 A1* | 9/2020 | Zhang | .................... | G10L 15/02 |

OTHER PUBLICATIONS

Fujimoto, "The Fundamentals and Recent Progress of Voice Activity Detection", Institute of Electronics, Information, and Communication Engineers, Research and Developmental Report, IEICE Technical Report, SP2010-23 (Jun. 2010), pp. 7-12 (12 total pages) (with unedited computer-generated English translation).

* cited by examiner

LEARNING SPEECH DATA GENERATING APPARATUS, LEARNING SPEECH DATA GENERATING METHOD, AND PROGRAM

TECHNICAL FIELD

The present invention relates to a technique of detecting an utterance period from an input signal.

BACKGROUND ART

Non-patent Literature 1 is known as an utterance period detection technique of detecting only an utterance period (a speech period) from an input speech signal and removing a period without utterance (a non-speech period). The role of the utterance period detection technique is to remove an unnecessary signal (non-speech) as speech recognition preliminary processing, which prevents a reduction in recognition accuracy. As the utterance period detection technique, there is a technique of detecting an utterance period (a speech period) and a non-utterance period (a non-speech period) by using a statistical speech/non-speech model constructed in advance using sound features of speech and non-speech as learning data (see Non-patent Literature 1).

In the utterance period detection technique based on the speech/non-speech model, speech likelihood and non-speech likelihood are calculated for each frame of an input speech signal and threshold processing is performed on the likelihood ratio thereof or the like, whereby a determination whether a period is a speech period is made.

To detect an utterance period robustly under various noise environments, it is necessary to learn a speech/non-speech model using speech data under various noise environments. However, it is difficult to prepare a large amount of speech data under noise environments needed for model construction. For this reason, noise is superimposed on speech data in a pseudo manner and the obtained data is used as learning data. In this case, an appropriate superimposition condition (signal-to-noise ratio) is manually adjusted in noise superimposition in accordance with a scene of assumed use.

PRIOR ART LITERATURE

Non-Patent Literature

Non-patent Literature 1: Masakiyo Fujimoto, "The Fundamentals and Recent Progress of Voice Activity Detection", IEICE Technical Report., SP2010-23 (2010 June), p. 7-12

SUMMARY OF THE INVENTION

Problems to be Solved by the Invention

However, in the existing technique, speech data under a noise environment is generated in a pseudo manner, which sometimes results in generation of speech data that is inconceivable in a scene of practical use. Learning a speech/non-speech model based on incorrect features resulting from such speech data causes false detection (a non-speech period is erroneously detected as a speech period) and false rejection (a speech period is erroneously rejected as a non-speech period). For example, learning performed based on speech data of a small voice under a high-noise environment sometimes causes false detection easily.

An object of the present invention is to provide a training speech data generating apparatus that generates speech data under a noise environment, which is close to speech that is uttered by a human under a noise environment, a training speech data generating method, and a program.

Means to Solve the Problems

To solve the above-described problem, according to an aspect of the present invention, a training speech data generating apparatus includes: a voice conversion unit that converts, using fourth noise data, which is noise data based on third noise data, and speech data, the speech data so as to make the speech data clearly audible under a noise environment corresponding to the fourth noise data; and a noise superimposition unit that obtains training speech data by superimposing the third noise data and the converted speech data.

Effects of the Invention

By using a speech/non-speech model learned using speech data under a noise environment, which was generated by the present invention, as training speech data, it is possible to detect an utterance period accurately from speech data under a noise environment.

DETAILED DESCRIPTION OF THE EMBODIMENTS

Figure 1:
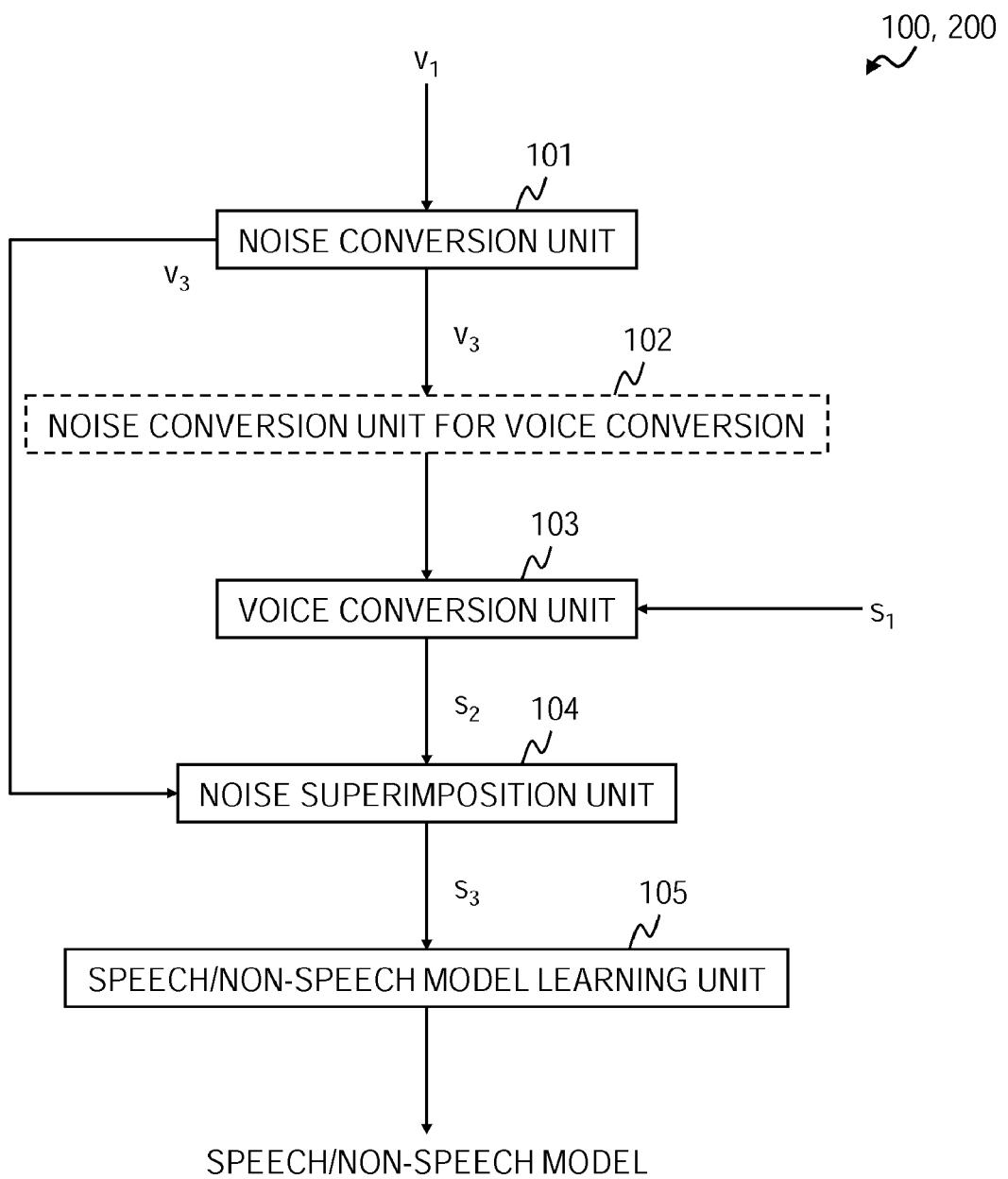
FIG. 1 is a functional block diagram of a speech/non-speech model learning apparatus according to a first embodiment and a second embodiment.

Hereinafter, embodiments of the present invention will be described. It is to be noted that, in the drawings which are used in the following description, component units having the same function and steps in which the same processing is performed are denoted by the same reference characters and overlapping explanations are omitted. In the following description, it is assumed that processing which is performed element by element of a vector and a matrix is applied to all the elements of the vector and the matrix unless otherwise specified.

First Embodiment

Figure 2:
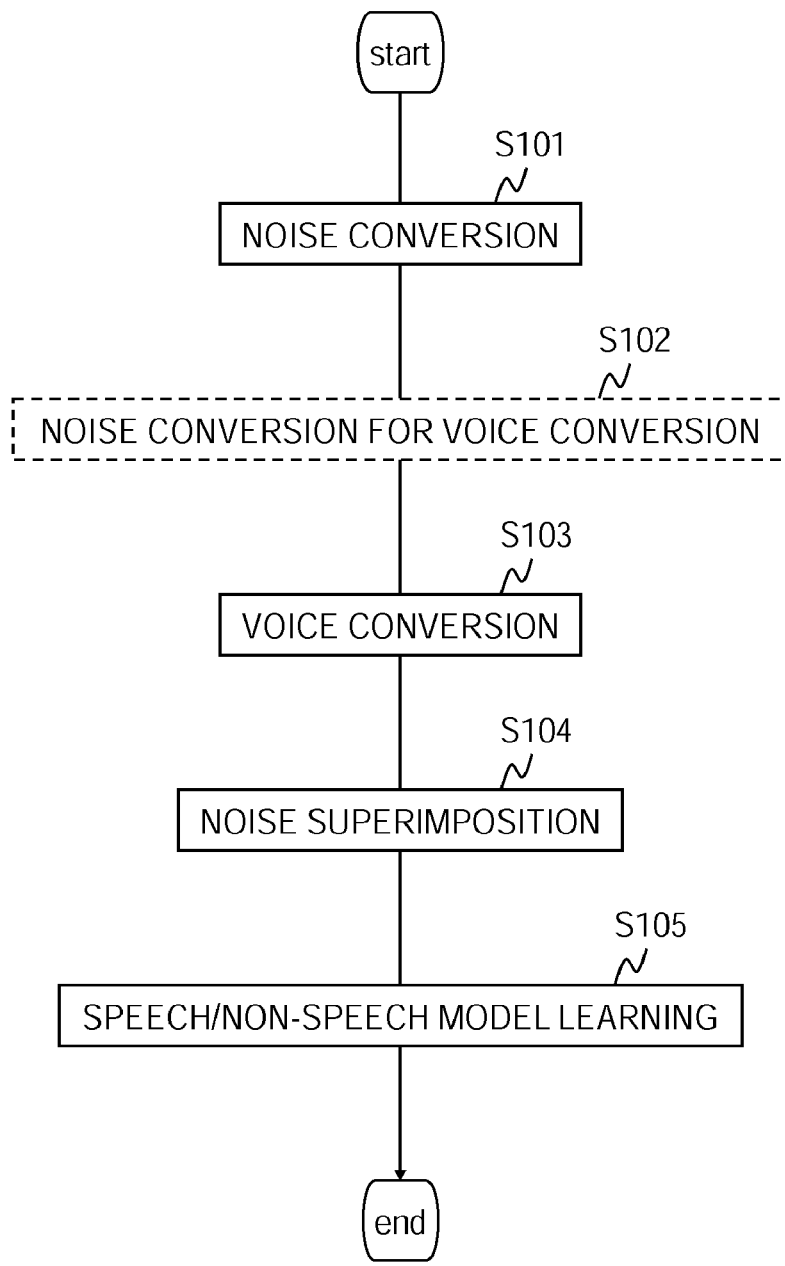
FIG. 2 is a diagram showing an example of a processing flow of the speech/non-speech model learning apparatus according to the first embodiment and the second embodiment.

FIG. 1 shows a functional block diagram of a speech/non-speech model learning apparatus according to a first embodiment, and FIG. 2 shows a processing flow of the speech/non-speech model learning apparatus.

The present embodiment does not simply superimpose noise data on speech data; in the present embodiment, voice conversion is performed on speech data in accordance with noise data to be imposed, such that the speech data is appropriately audible under a noise environment, and the converted speech data on which the noise data was superimposed is used as learning data.

A speech/non-speech model learning apparatus 100 includes a noise conversion unit 101, a noise conversion unit 102 for voice conversion, a voice conversion unit 103, a noise superimposition unit 104, and a speech/non-speech model learning unit 105.

The speech/non-speech model learning apparatus is a special apparatus configured as a result of a special program being read into a publicly known or dedicated computer including, for example, a central processing unit (CPU), a main storage unit (random access memory: RAM), and so forth. The speech/non-speech model learning apparatus executes each processing under the control of the central processing unit, for example. The data input to the speech/non-speech model learning apparatus and the data obtained by each processing are stored in the main storage unit, for instance, and the data stored in the main storage unit is read into the central processing unit when necessary and used for other processing. At least part of each processing unit of the speech/non-speech model learning apparatus may be configured with hardware such as an integrated circuit. Each storage of the speech/non-speech model learning apparatus can be configured with, for example, a main storage unit such as random access memory (RAM), an auxiliary storage unit configured with a hard disk, an optical disk, or a semiconductor memory device such as flash memory, or middleware such as a relational database or a key-value store.

The speech/non-speech model learning apparatus 100 uses learning noise data (hereinafter also referred to simply as "noise data") $v_1$ and training speech data (hereinafter also referred to simply as "speech data") $s_1$ as input, learns a speech/non-speech model using these pieces of data, and outputs the learned speech/non-speech model. In the following description, the details of processing which is performed by each unit will be described.

<Noise Conversion Unit 101>

The noise conversion unit 101 varies the volume (gain) of noise data to create learning data under various noise environments.

For example, the noise conversion unit 101 obtains, using noise data $v_1$ as input, noise data $v_2$ by normalizing the volume of the noise data $v_1$, obtains noise data $v_3$ by varying the volume of the noise data $v_2$ from a normalized level in a predetermined range (S101), and outputs the noise data $v_3$. As the predetermined range, it is only necessary to set the range of a volume which is assumed to be noise, and it is only necessary to use the representative value thereof as the normalized level. The range and the mean value of the volume of common noise may be used, or actual noise data may be used to set. For instance, a range into which actual noise data can fall, the interquartile range of actual noise data, or the like may be set as the predetermined range and the representative value (the mean value, the median value, the mode, or the like) of the volume of actual noise data may be used as the normalized level.

For example, by setting the normalized level at −26 dBov, varying the volume in the range of ±15 dBov, and varying the volume of noise data in the range from about −41 dBov to −11 dBov, it is possible to simulate various noise environments. For instance, seven pieces of noise data $v_3$ (−41 dBov, −36 dBov, −31 dBov, −26 dBov, −21 dBov, −16 dBov, and −11 dBov) may be obtained by varying the volume every 5 dBov and output. Even when seven pieces of noise data $v_3$ are prepared, there is no difference in processing which is performed on each noise data $v_3$; therefore, in the following description, an explanation will be given on the assumption that processing is performed on one piece of noise data $v_3$.

<Noise Conversion Unit 102 for Voice Conversion>

The noise conversion unit 102 for voice conversion receives the noise data $v_3$, obtains noise data $v_4$ by lowering the volume of the noise data $v_3$ (S102), and outputs the noise data $v_4$.

That is, a volume adjustment is made to the noise data $v_3$ such that the volume thereof is lowered. For example, an adjustment can be made in the range of about 0 to 10 dB.

<Voice Conversion Unit 103>

The voice conversion unit 103 receives the noise data $v_4$ and speech data $s_1$, converts the speech data $s_1$ so as to make the speech data $s_1$ clearly audible under a noise environment corresponding to the noise data $v_4$ (S103), and outputs speech data $s_2$ obtained by conversion.

It is known that humans involuntarily raise their voice and utter clearly under a noise environment. This phenomenon is called the Lombard effect. A technique of converting speech data (speech data without noise) to speech data which is clearly audible under a noise environment by imitating the feature of the Lombard effect is known (see Reference Literature 1).

(Reference Literature 1) Antti Suni, et al. "Lombard Modified Text-to-Speech Synthesis for Improved Intelligibility: Submission for the Hurricane Challenge 2013", INTERSPEECH 2013

For example, the voice conversion unit 103 converts the speech data $s_1$ based on the noise data $v_4$ using Reference Literature 1 so as to make the speech data $s_1$ clearly audible under a noise environment corresponding to the noise data $v_4$. By applying Reference Literature 1, speech data is converted so that the speech data is clearly audible even under a noise environment. Converting speech data means, for example, converting speech parameters such as the volume, the phoneme duration, and the rate of utterance. In Reference Literature 1, the phoneme duration is made longer, the fundamental frequency is increased, the spectral slope is made smaller, the harmonics-to-noise ratio is increased, and the speech formant is enhanced.

In this case, as noise data which is referred to in order to convert the speech data $s_1$, the noise data $v_4$ which is the output value of the noise conversion unit 102 for voice conversion, not the noise data $v_3$ which is the output value of the noise conversion unit 101, is used. In Reference Literature 1, conversion of speech data is performed to maximize articulation; in the present embodiment, conversion of speech data is performed to generate learning data for construction of a speech/non-speech model. For this reason, to generate learning data using somewhat unclear utterance, the noise data $v_4$, whose volume is made lower than that of the noise data $v_3$ to be superimposed, is used. More specifically, if speech data is converted using the high-volume noise data $v_3$, the speech data is converted so that the speech data is clearly audible relative to the high-volume noise data $v_3$, which makes the converted speech data too clear and unnatural as learning data for construction of a speech/non-speech model. Thus, the noise data $v_4$ whose volume was lowered is used at the time of conversion of speech data and the high-volume noise data $v_3$ is used when noise is superimposed in the noise superimposition unit 104, which will be described below.

<Noise Superimposition Unit 104>

The noise superimposition unit 104 receives the noise data $v_3$ and the speech data $s_2$, superimposes the noise data $v_3$ and the speech data $s_2$ (S104), and outputs the obtained speech data as speech data $s_3$. Since the speech data $s_3$ is used to construct a model that distinguishes between non-speech (noise) and speech, it is preferable to perform superimposition with a period containing only noise being provided before and after a speech length.

<Speech/Non-Speech Model Learning Unit 105>

The speech/non-speech model learning unit 105 receives the speech data $s_3$, learns, from the speech data $s_3$, a speech/non-speech model that distinguishes between non-speech (noise) and speech (S105), and outputs the learned speech/non-speech model. As a speech/non-speech model learning method, a publicly known learning technique, for example, a deep learning technique can be used (see Reference Literature 2).

(Reference Literature 2) Hinton et al., "Deep Neural Networks for Acoustic Modeling in Speech Recognition", IEEE SP magazine, November 2012 Modeling can be performed using, for example, long short-term memory (LSTM) that can take long time-series information into consideration.

Effects

With the above configuration, it is possible to construct a speech/non-speech model that can accurately detect a speech period and a non-speech period from speech data under a noise environment. For example, even when utterance of a person, who is not a person whose speech period/non-speech period is to be detected, is contained in background noise, it is presumed that a person whose speech period/non-speech period is to be detected will utter words so as to make the utterance clearly audible; therefore, by constructing a speech/non-speech model taking the feature of the utterance into consideration and using the speech/non-speech model, it is possible to detect an utterance period more accurately than the existing technique.

Modifications

In the present embodiment, the speech/non-speech model learning apparatus includes the noise conversion unit 101; the noise conversion unit 101 does not necessarily have to be included as long as noise data whose volume is a predetermined volume can be used as input.

Moreover, the speech/non-speech model learning apparatus may be made to function as a training speech data generating apparatus including the noise conversion unit 102 for voice conversion, the voice conversion unit 103, and the noise superimposition unit 104 (and the noise conversion unit 101 when necessary). The training speech data generating apparatus generates, using noise data $v_1$ and speech data $s_1$ as input, speech data $s_4$ using these pieces of data and outputs the speech data $s_4$. The training speech data generating apparatus can generate speech data under a noise environment, which is close to speech that is uttered by a human under a noise environment, and use the generated speech data as training speech data. By using this training speech data, it is possible to learn a speech/non-speech model of the first embodiment.

In the voice conversion unit 103, a speech data conversion method is not limited to Reference Literature 1; any conversion method may be used as long as the conversion method converts speech data so as to make the speech data clearly audible under a noise environment corresponding to noise data.

Second Embodiment

A portion which is different from that of the first embodiment will be mainly described.

FIG. 1 shows a functional block diagram of a speech/non-speech model learning apparatus according to a second embodiment, and FIG. 2 shows a processing flow of the speech/non-speech model learning apparatus.

A speech/non-speech model learning apparatus 200 includes a noise conversion unit 101, a voice conversion unit 103, a noise superimposition unit 104, and a speech/non-speech model learning unit 105.

That is, the speech/non-speech model learning apparatus 200 does not include a noise conversion unit 102 for voice conversion and does not perform S102.

The voice conversion unit 103 receives noise data $v_3$ and speech data $s_1$, converts the speech data $s_1$ so as to make the speech data $s_1$ clearly audible under a noise environment corresponding to the noise data $v_3$ (S103), and outputs speech data $s_2$ obtained by conversion.

It is to be noted that noise data which is used in the voice conversion unit 103 is also referred to as "fourth noise data which is noise data based on third noise data". In the first embodiment, the third noise data is $v_3$ and the fourth noise data is $v_4$; in the second embodiment, the fourth noise data is the third noise data itself and $v_3$.

As described in the first embodiment, if speech data is converted using the high-volume noise data $v_3$, the speech data is converted so that the speech data is clearly audible relative to the high-volume noise data $v_3$, which undesirably makes the converted speech data too clear. Thus, this embodiment can be used when, for example, construction of a speech/non-speech model that can accurately identify only clear utterance is needed.

Effects

This configuration makes it possible to obtain the same effects as those of the first embodiment. As compared to the speech/non-speech model of the first embodiment, the accuracy of detection of clear utterance is increased and the accuracy of detection of unclear utterance is reduced. The present embodiment may be combined with the modification of the first embodiment.

Other Modifications

The present invention is not limited to the above embodiments and modification. For example, the above-described various kinds of processing may be executed, in addition to being executed in chronological order in accordance with the descriptions, in parallel or individually depending on the processing power of an apparatus that executes the processing or when necessary. In addition, changes may be made as appropriate without departing from the spirit of the present invention.

<Program and Recording Medium>

Further, various types of processing functions in the apparatuses described in the above embodiments and modification may be implemented on a computer. In that case, the contents of processing function to be contained in each apparatus are written by a program With this program executed on the computer, various types of processing functions in the above-described apparatuses are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be distributed by storing the program in a storage unit of a server computer and transferring the program from the server computer to other computers via a network.

A computer which executes such program first stores the program recorded in a portable recording medium or transferred from a server computer once in a storage thereof, for example. When the processing is performed, the computer reads out the program stored in the storage thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that the program includes information which is provided for processing performed by electronic calculation equipment and which is equivalent to a program (such as data which is not a direct instruction to the computer but has a property specifying the processing performed by the computer).

Moreover, the apparatuses are assumed to be configured with a predetermined program executed on a computer. However, at least part of these processing contents may be realized in a hardware manner.

What is claimed is:

1. A training speech data generating apparatus comprising:
    processing circuitry configured to:
    obtain, using first noise data as input, second noise data by normalizing the volume of the first noise data, and obtain third noise data by varying the volume of the second noise data from a normalized level in a predetermined range;
    convert, using fourth noise data, which is noise data based on third noise data, and speech data, the speech data so as to make the speech data clearly audible under a noise environment corresponding to the fourth noise data;
    obtain training speech data by superimposing the third noise data and the converted speech data;
    obtain the fourth noise data by lowering a volume of the third noise data; and
    construct a speech/non-speech model that distinguishes between non-speech and speech using the training speech data.

2. A non-transitory computer-readable recording medium that records a program for making a computer function as the training speech data generating apparatus according to claim 1.

3. A training speech data generating method, implemented by a training speech data generating apparatus that includes processing circuitry, comprising:
    a noise conversion step in which the processing circuitry obtains, using first noise data as input, second noise data by normalizing the volume of the first noise data, and obtains third noise data by varying the volume of the second noise data from a normalized level in a predetermined range;
    a voice conversion step in which the processing circuitry converts, using fourth noise data, which is noise data based on third noise data, and speech data, the speech data so as to make the speech data clearly audible under a noise environment corresponding to the fourth noise data;
    a noise superimposition step in which the processing circuitry obtains training speech data by superimposing the third noise data and the converted speech data;
    a noise conversion step for voice conversion in which the processing circuitry obtains the fourth noise data by lowering a volume of the third noise data; and
    a construction step of constructing a speech/non-speech model that distinguishes between non-speech and speech using the training speech data.

* * * * *